United States Patent [19]

Schweikert et al.

[11] Patent Number: 5,021,927
[45] Date of Patent: Jun. 4, 1991

[54] COOLING SYSTEM FOR WOUND ELECTROLYTIC CAPACITOR

[75] Inventors: Wilhelm Schweikert, Heidenheim-Mergelst; Norbert Will, Heidenheim, both of Fed. Rep. of Germany

[73] Assignee: Siemens Aktiengesellscaft, Berlin and Munich, Fed. Rep. of Germany

[21] Appl. No.: 482,019

[22] Filed: Feb. 20, 1990

[30] Foreign Application Priority Data

Mar. 31, 1989 [EP] European Pat. Off. ........... 89105716

[51] Int. Cl.⁵ .............................................. H01G 9/06
[52] U.S. Cl. .................................................. 361/514
[58] Field of Search ............................. 361/514, 530

[56] References Cited

U.S. PATENT DOCUMENTS 3,670,210 6/1972 Blase .................................. 361/514
3,681,666 8/1972 Bowling ............................. 361/514

FOREIGN PATENT DOCUMENTS 0214788 3/1987 European Pat. Off. .

OTHER PUBLICATIONS

8181 New Electronics 19 (1986) Sep., No. 19, London Great-Britian Electrolytic Capacitor Design for Extended Component Life.
Siemens Datenbuch 1989/90 Aluminum-und Tantal-Elektrolyt-Kondensatoren 30 Nov. 1988.

Primary Examiner—Donald A. Griffin
Attorney, Agent of Firm—Hill, Van Saten, Steadman & Simpson

[57] ABSTRACT

A cooling system for an electrical wound electrolyte capacitor wherein the capacitor winding 4 is mounted in a metallic cylindrical-shape housing 5 and the winding 4 has electric foils 7 and 9 which project from both ends with one of the foils being in thermic contact with the floor of the housing 6 and the other foil 9 being in thermal contact with a metallic plate 16. The heat bridges thus formed by faster and greater heat removal for high alternating currents because the temperature within the capacitor is reduced by the two separate bridges.

8 Claims, 5 Drawing Sheets $R_{hc} = R_{wc} + R_{hw}$ $R'_{hc} = \frac{1}{2} R_{wc} + \frac{1}{4} R_{hw}$

COOLING SYSTEM FOR WOUND ELECTROLYTIC CAPACITOR

BACKGROUND OF THE INVENTION

1. Field of the Invention

This invention relates in general to an electrical capacitor which is formed of electrical foil particularly a wound electrolytic capacitor for high alternating current loads which is mounted in a metallic housing and has a metallic heat bridge between the capacitor and the housing which is formed by an electrode foil that overlaps an end face at one end and is in thermal contact with the floor of the housing at the other end.

2. Description of the Prior Art

Wound electrolytic capacitors are generally formed of an anode foil of aluminum which is provided with a dielectric oxide layer. The cathode of the capacitor is formed by an operating electrolyte which is usually stored in absorbent insulating foils of, for example, paper. A further aluminum foil which is the cathode foil serves as the cathode lead.

When loading such a capacitor with alternating current, heat occurs and is dissipated in the capacitor winding and to the environment by way of the housing. The heat causes overheating of the capacitor winding and, thus, greatly reduces the useful life of the device.

So as to reduce the thermal resistance between the hot winding and the housing, wound electrolyte capacitors for high alternating currents loads have an additional metallic heat bridge from the capacitor winding to the floor of the housing. This heat bridge is formed by the cathode foil which projects to the floor of the housing at one end and is thus in thermal contact with the housing. For better heat elimination, a cooling sheet can be secured to the floor of the housing and forced cooling as with water, oil or air can be utilized. The relationships which exist are described in the publication Siemens-Datenbuch 1989/90, "Aluminum-und Tantal-ElektrolytKondensatoren", at pages 31-36, Chapter 5.5, "Wechselstrombelastung". See also European Patent Application 214,788, U.S. Pat. No. 3,681,666, U.S. Pat. No. 3,670,210 and Page 39 of New Electronics of 30 Sept. 1986 article entitled "Electrolytic Capacitor Design For Extended Component Life".

SUMMARY OF THE INVENTION

In the prior art due to the above-described thermal contact of only one end of the winding to the housing large amounts of heat must be eliminated which must pass over long paths so that the alternating current load is limited for a prescribed useful life.

It is an object of the present invention to reduce the thermal resistance between a capacitor winding and the housing so that the capacitor can be exposed to higher alternating currents without having undesired elevation of temperature.

It is an object of the present invention to provide a second heat bridge in the capacitor which is formed by an electrode foil that extends beyond the second end face of the capacitor and that is in thermal contact with an additional part of the housing.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
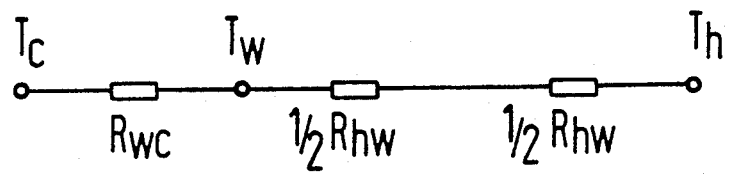
FIG. 1 is a schematic view showing the thermal resistance in a traditional capacitor.

FIG. 1 illustrates schematically the path for heat elimination of a traditional wound electrolytic capacitor which has cathode foils which project at one end to the floor of the housing cup so that heat elimination occurs by way of the floor of the cup. $T_h$ is the "hot spot temperature" which occurs in the capacitor winding due to the dissipated heat. $T_w$ is the outer winding temperature and $T_c$ is the housing temperature. $R_{hw}$ is the thermal resistance in the winding to the "hot spot region" and $R_{wc}$ is the thermal resistance between the winding and the housing. The thermal resistance between the "hot spot region" and the housing is $R_{hc} = R_{wc} + R_{hw}$.

Figure 2:
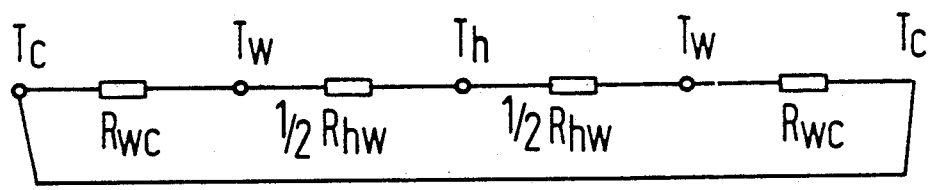
FIG. 2 is a schematic drawing showing the thermal resistance in the capacitor of the invention.

FIG. 2 is a schematic illustration which shows the heat transfer path for a capacitor which has a second heat bridge. In this case, $R'_{hc} = \frac{1}{2}R_{wc} + \frac{1}{4}R_{hw}$ for the thermal resistance between the hot spot region and the housing. The thermal resistance in the winding is thus reduced by the second heat bridge by 75% and the thermal resistance between the winding and the housing is reduced by 50% due to the second heat bridge formed in the capacitor.

Figure 3:
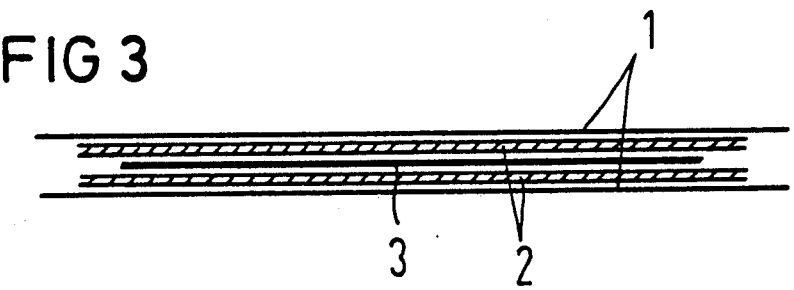
FIG. 3 illustrates a sectional view of a winding which has cathode foils which project.

FIG. 3 is a sectional view showing the method of winding that shows a capacitor which is constructed by an anode foil 3 and of two projecting cathode foils 1. Spacers 2 which are composed of, for example, of paper and in which electrolyte is stored are arranged between anode foil 3 and the cathode foils 1. The projecting ends of the cathode foils 1 are in thermal contact first with the floor of the housing cup and second with an additional housing part so that two separate heat bridges result.

Figure 4:
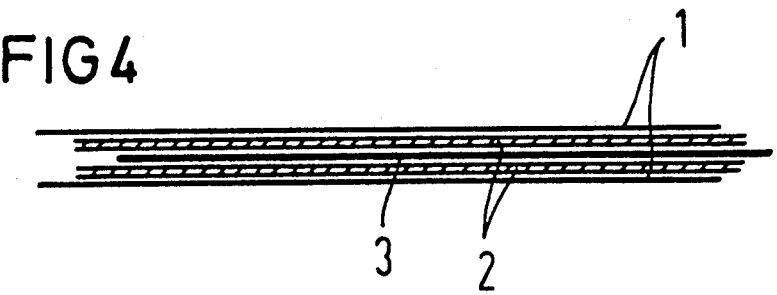
FIG. 4 is a sectional view which shows projecting cathode and anode foils.

FIG. 4 illustrates another winding strategy for a capacitor wherein the cathode foils 1 project only on one end and form the first heat bridge and the second heat bridge is formed by the projecting anode foil 3.

The respective foils may project beyond the end faces for example, 6 mm and the winding strategies illustrate only one anode foil and two cathode foils. This is required for better heat transfer since the anode foils in a wound electrolytic capacitor are generally two to four times thicker than the cathode foils. Under other conditions, it is adequate to wind one cathode foil with one anode foil.

Figure 5:
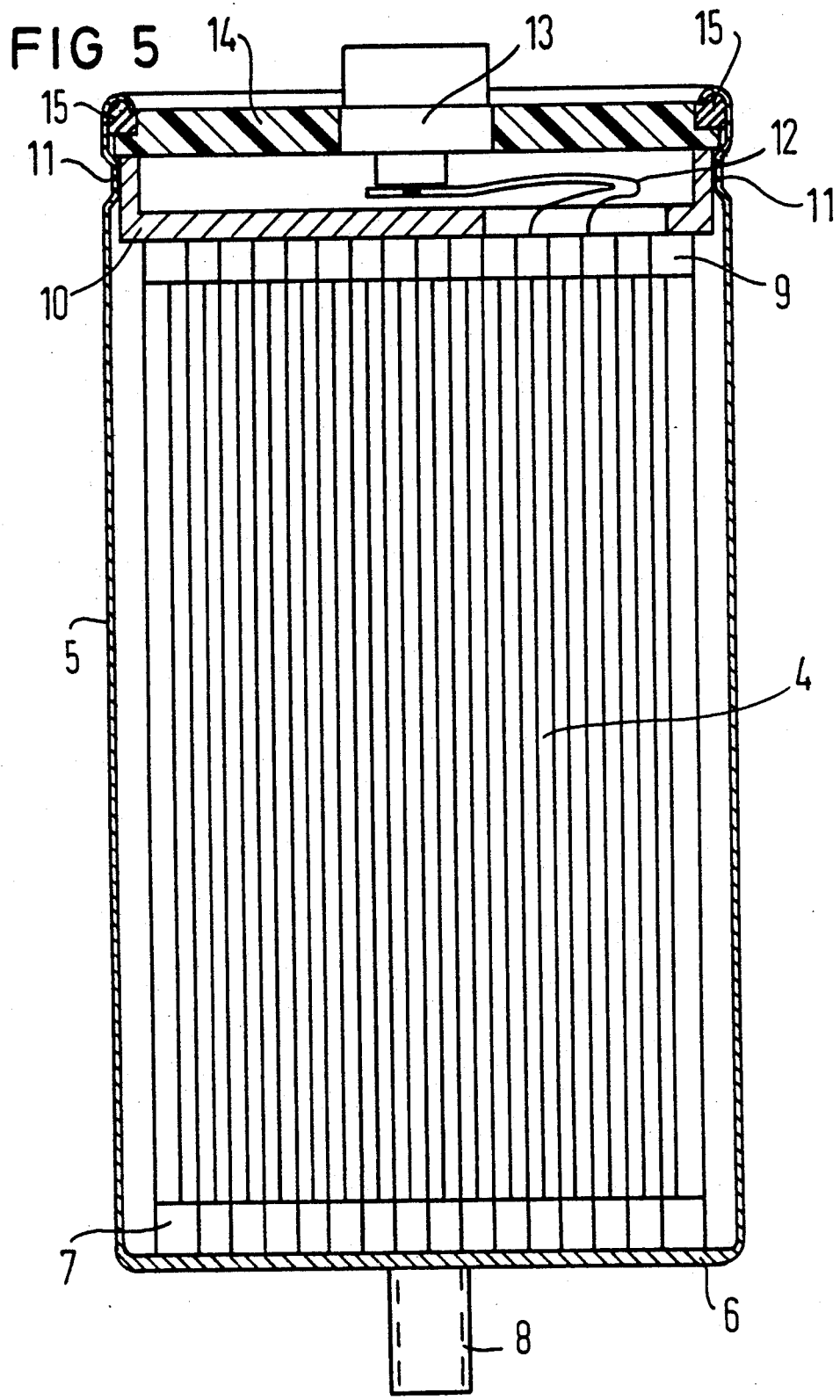
FIG. 5 is a sectional view of a capacitor according to the invention which has an additional heat elimination plate.

FIG. 5 is a sectional view illustrating an electrolytic capacitor according to the invention which has a capacitor winding 4 mounted in a metallic housing 5. The winding 4 has projecting cathode foils 7 at one end which are in thermal contact with the metallic floor 6 of the housing 5. A terminal contact 8 which is preferably threaded on its outer surface is mounted on the floor 6 and a cooling plate not shown for example, can be secured to the terminal contact 8.

At the other end face of the capacitor winding 4, projecting electrode foils that have either the same polarity as the projecting foil 7 or the opposite polarity of the foils 7 extend. The projecting foils 9 thus may be either the cathode foils or the anode foil. The projecting foils 9 are in thermal contact with the metallic plate 10 which may be an aluminum disk which forms a second heat bridge. The plate 10 is in thermal contact with the housing 5 at the end 11. This connection can occur with a press fit or with beading from the outside of the housing. When the projecting electrode foils 7 and 9 have different polarities, the metallic plate must be electrically insulated from the housing 5 by insulation mounted between the housing 5 and the plate 10.

When the projecting electrode foils 9 have the same polarity as the projecting foil 7, the terminal strips 12 for the foils of the other polarity must be electrically conducted through the metal plate 10 in insulation fashion as, for example, by forming a hole in the plate 10 as shown in FIG. 5. The terminal strips 12 are connected to an electrical terminal 13 that is mounted in a cover dish 14 that may be made of insulating material. The cover disk 14 is secured by crimping to the housing 5 and a rubber sealing ring 15 is mounted between the housing 5 and the cover disk 14. In the embodiment of FIG. 5, the heat may pass from the condenser through the projection 7 to the base or floor 6 and also through the extending projecting foils 9 to the second bridge 10 and to the housing 5 at the other end.

Figure 6:
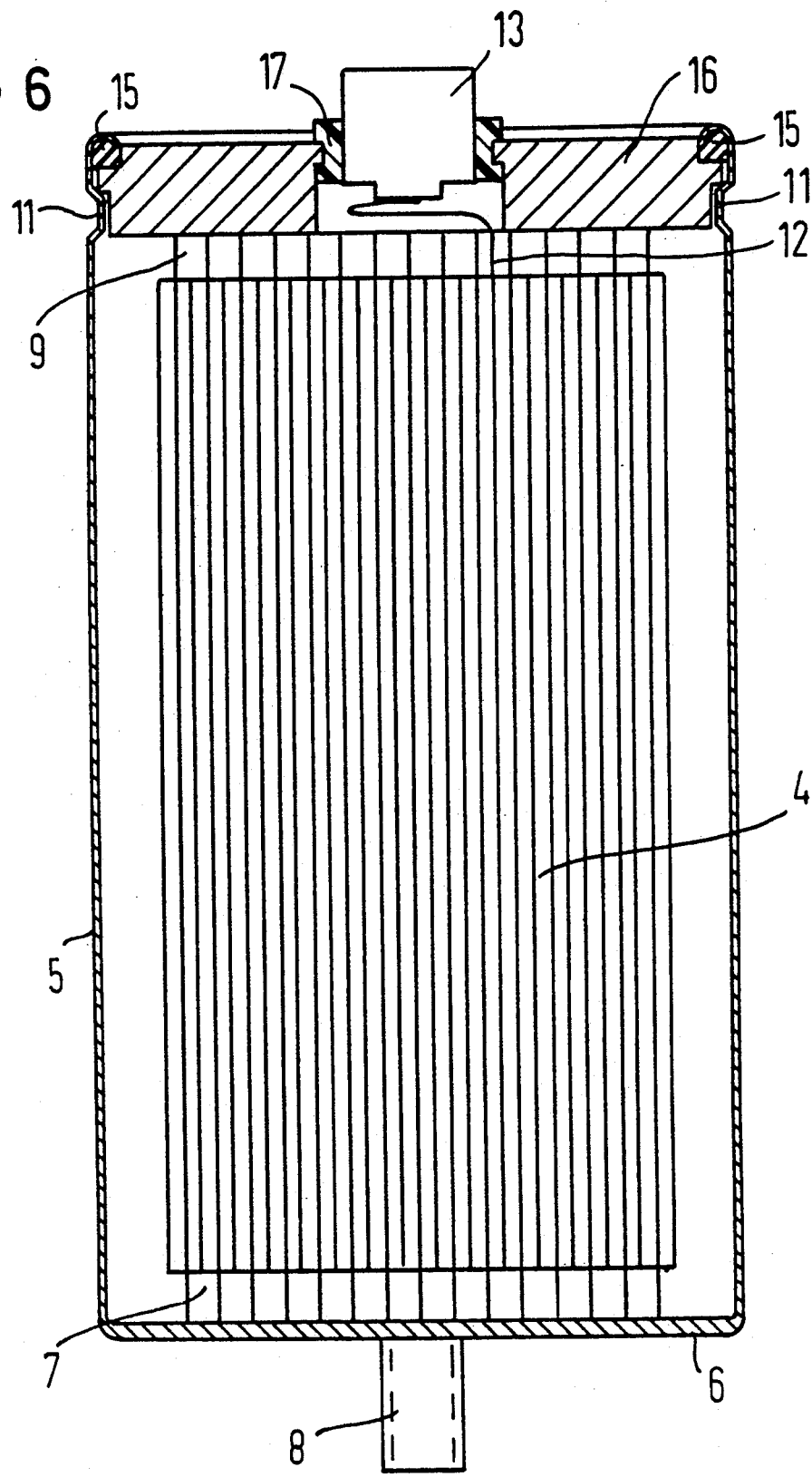
FIG. 6 is a sectional view of a modified form of the invention.

FIG. 6 illustrates another embodiment of the invention wherein the housing 5 has its upper end closed by a metallic plate 16 to which the projecting electrode foils 9 are connected so that the metallic plate 16 serves as a heat transfer member from the foils 9. An electrical bushing or contact 13 which is electrically insulated from the plate 16 by insulation 17 is mounted in the plate 16 and terminal strips 12 extend from the connector 13 to the second foil in the capacitor 4. The plate 16 might be an aluminum covered disk, for example.

Although terminating disk of aluminum are known from the prior art, such prior art disk only serve the purpose of high temperature resistant sealing of the housing. The elimination of the dissipated heat does not occur in such prior art devices since there is no thermal contact to the winding.

Figure 7:
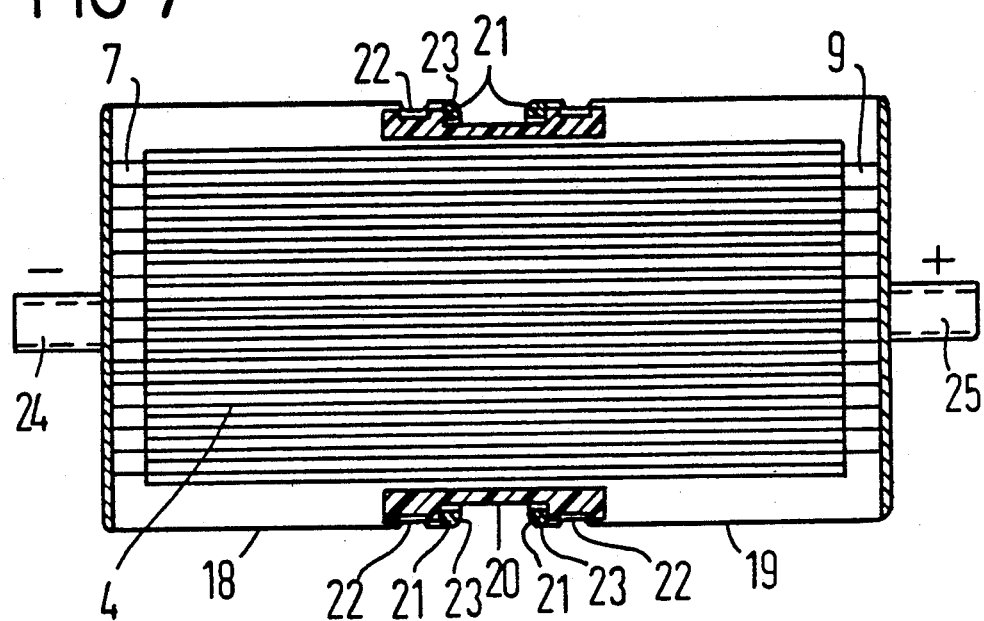
FIG. 7 is a sectional view illustrating a further modification of the invention.

FIG. 7 illustrates another embodiment wherein the housing is formed of two cylindrical cups 18 and 19. The capacitor winding 4 has projecting cathode foil 7 at one end and projecting anode foils at the other end. Each end is electrically and thermally connected to its one of the metal cups 18 and 19 respectively, which may be made of aluminum, for example. The cups 18 and 19 are joined by radial electrically insulating member 20 by beads 22 and crimps 23. Only one of these such as beads 22 or crimps 23 may be used if desired. When using crimping 23, rubber rings 21 are provided for sealing as shown.

Insulation of the anode lead is not required in this embodiment. The anode cup 19 should desirably have an appropriate purity for electrical reasons. The cups 18 and 19 each have threaded extensions 24 and 25 for electrical connections.

Due to the high symmetry of the device of FIG. 7, the embodiment has high resistance to vibration particularly when the winding 4 is adapted to the inside diameter of the insulating part 20.

It is also possible to provide an embodiment which has two cathode connecting housing cups. For this embodiment, electrical bushings are arranged in the insulating part 20 so that the anode terminal can be conducted out of the housing in an insulated manner.

Figure 8:
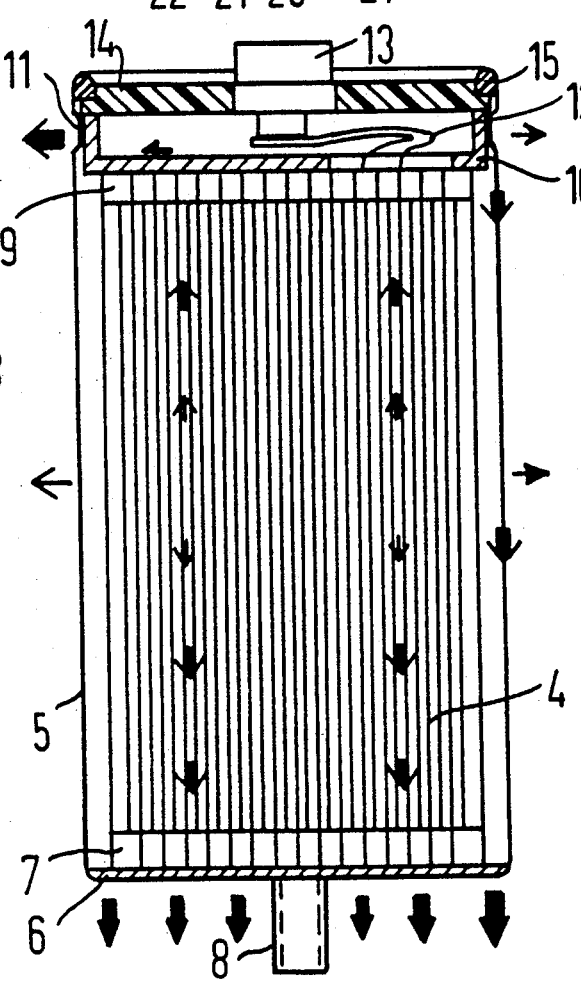
FIG. 8 illustrates the distribution of the heat flow and a capacitor using different cooling methods.

FIG. 8 illustrates the heat flow for the embodiment shown in FIG. 5 with arrows which have different thicknesses. The heat fluxes for full cooling are shown in the left hand portion of FIG. 8 and the heat fluxes for bottom cooling are shown in the right hand part. The winding 4 of an electrolytic capacitor is 30-40% aluminum and inherently has high thermal conductivity. Due to the winding strategy however, this is present only in the direction of the winding axis and for this reason the heat flux flows to the floor 6 or respectively to the plate 10 by way of the projecting foil 7 or, respectively, 9 despite the longer path.

Figure 9:
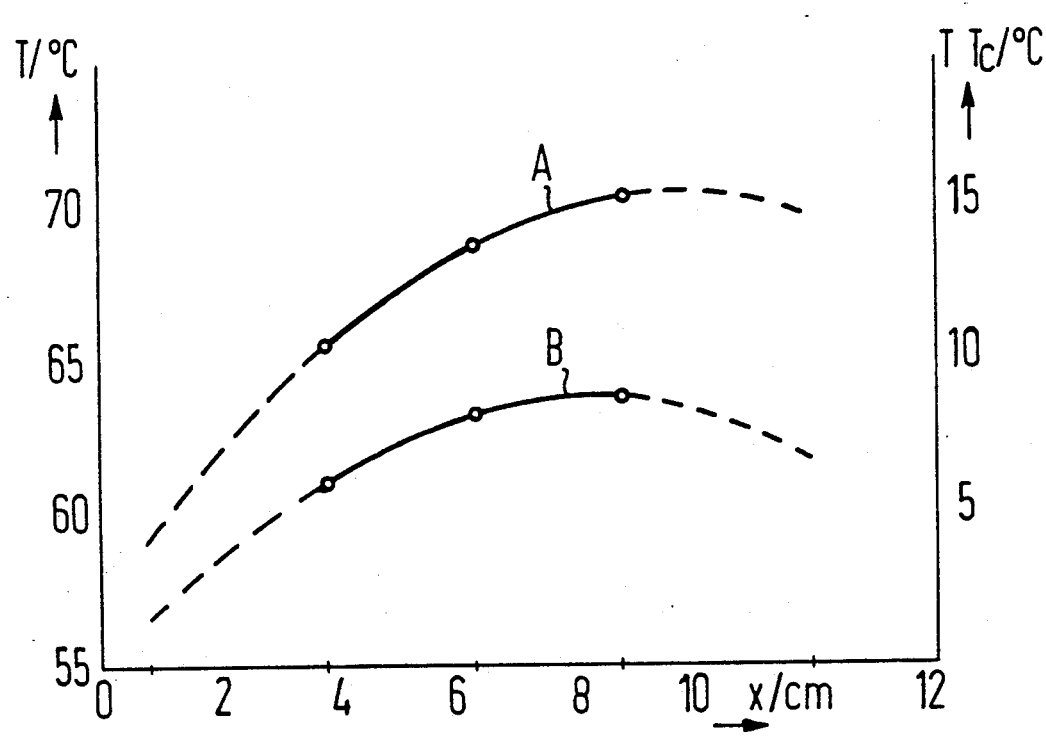
FIG. 9 is a graph showing the temperature distribution in the axis of the capacitor winding.

Electrolytic capacitors having nominal characteristics of 4700 microfarad/350 volt were mounted into a housing which has the dimensions of 75 mm in diameter by 145 mm long. FIG. 9 illustrates the temperature distribution in the winding axis for a load of 100A/20 kHz/55° C. coolant temperature. The curve A refers to the housing which is cooled only at the floor and the curve B refers to housings which are complete cooled. The curves of FIG. 9 were measured for the embodiment illustrated in FIG. 6 wherein the temperature distribution in the winding axis is shown as a function of the distance x from the floor 6 of the housing 5.

The maximum access temperature $T - T_c$ in the winding axis amounted to 90° C. with full cooling curve B wherein 27°-33° C. access temperature resulted in a traditional electrolytic capacitor which depended on the cathode thickness.

With the limitation of the housing cooling to the cup floor shown in Curve A the excess temperature increased to 16° C. since the heat flow along the cup wall creates an additional temperature gradient as shown in FIG. 8 in the right hand portion. That is, however, is still less than in the traditional electrolytic capacitor. A thicker cup wall is thus meaningful with a single sided housing cooling.

In addition to being employed in the embodiments of wound electrolytic capacitors such as shown in the drawings, the invention can also be used for better heat elimination in other capacitors having self-bearing electrode foils.

Although the invention has been described with respect to preferred embodiments, it is not to be so limited as changes and modifications can be made which are within the full intended scope of the invention as defined by the appended claims.

We claim as our invention:

1. An electrical capacitor having self-bearing electrode foils, particularly a wound electrolyte capacitor for high alternating currents which is integrated in a metallic housing and has a metallic heat bridge between the capacitor and the housing, said heat bridge being formed by an electrode metal foil which projects beyond an end face at one end and which makes thermic contact with the floor of the housing, characterized in that a second heat bridge is formed by an electrode metal foil which projects beyond another end and is in thermic contact with a further portion of the housing arranged in the capacitor.

2. An electrical capacitor according to claim 1, characterized in that the electrode foils which project beyond the two ends have the sam polarity.

3. An electrical capacitor according to claim 1, characterized in that the electrode foils which project beyond the two ends have different polarities.

4. An electrical capacitor according to claim 1 or 2 or 3, characterized in that the further portion of the housing is formed of metallic plate (10, 16).

5. An electrical capacitor according to claim 4, characterized in that said metallic plate (16) is formed as the end of said housing.

6. An electrical capacitor according to claim 1 characterized in that the metallic housing is formed in two parts.

7. An electrical capacitor according to claim 6, characterized in that said two housing parts (18, 19) are joined together by a radial, electrically insulating member (20) when electrode foils (7, 9) which have different polarities ar conducted out of said housing.

8. An electrical capacitor according to claim 1 or 2 or 3, characterized in that said electrical capacitor comprises a plurality of electrode foils which have the same polarity.

* * * * *